(12) United States Patent
Fukushima

(10) Patent No.: US 9,106,608 B2
(45) Date of Patent: Aug. 11, 2015

(54) COMMUNICATION DEVICE, COMMUNICATION METHOD, AND NON-TRANSITORY COMPUTER-READABLE RECORDING MEDIUM

(71) Applicant: OLYMPUS CORPORATION, Tokyo (JP)

(72) Inventor: Keito Fukushima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 290 days.

(21) Appl. No.: 13/772,955

(22) Filed: Feb. 21, 2013

(65) Prior Publication Data

US 2013/0227063 A1    Aug. 29, 2013

(30) Foreign Application Priority Data

Feb. 23, 2012    (JP) ................................. 2012-037832

(51) Int. Cl.
*G06F 15/16* (2006.01)
*H04L 29/08* (2006.01)

(52) U.S. Cl.
CPC .............. *H04L 67/02* (2013.01); *H04L 67/025* (2013.01); *H04L 67/141* (2013.01)

(58) Field of Classification Search
USPC ........................................ 709/217; 705/40, 5
See application file for complete search history.

(56) References Cited

U.S. PATENT DOCUMENTS

2011/0288894 A1* 11/2011 Hutschemaekers et al. ...... 705/5

FOREIGN PATENT DOCUMENTS

| JP | 2004-120385 | A  | 4/2004  |
|----|-------------|----|---------|
| JP | 3840243     | B2 | 11/2006 |
| JP | 2007-034778 | A  | 2/2007  |
| JP | 2007-258935 | A  | 10/2007 |
| JP | 2010-109566 | A  | 5/2010  |
| JP | 2010-135866 | A  | 6/2010  |

OTHER PUBLICATIONS

Notice of Allowance dated Jan. 6, 2015, issued in corresponding Japanese Patent Application No. 2012-037832, with English Translation (6 pages).

* cited by examiner

*Primary Examiner* — Kyung H Shin
(74) *Attorney, Agent, or Firm* — Westerman, Hattori, Daniels & Adrian, LLP

(57) ABSTRACT

A communication device according to one aspect of the present invention includes: an input and output unit; a communication unit; and a controller. The input and output unit is configured to receive a first instruction relating to activation of service. The communication unit is configured to communicate with a plurality of other communication devices. The controller is configured to, when the input and output unit receives the first instruction, control the communication unit to transmit to the other communication devices, first data indicating the activation of service. The controller is configured to, in a first case that the first instruction includes no identifiers of the other communication devices, control the communication unit to transmit to the other communication devices which transmits a connection request to the communication device in response to the first data, a negative response indicating non-acknowledgment of the connection request.

20 Claims, 11 Drawing Sheets

FIG. 4

| LENGTH | PACKET LENGTH |
| --- | --- |
| TYPE | PACKET TYPE: PTP CONNECTION REQUEST |
| ID | PTP INITIATOR IDENTIFIER |
| NAME | PTP INITIATOR NAME |
| VERSION | SUPPORTED VERSION |

FIG. 5

| LENGTH | PACKET LENGTH |
| --- | --- |
| TYPE | PACKET TYPE: PTP CONNECTION ACCEPTANCE RESPONSE |
| CONNECTION NO | CONNECTION NUMBER |
| ID | PTP RESPONDER IDENTIFIER |
| NAME | PTP RSPONDER NAME |
| VERSION | SUPPORTED VERSION |

FIG. 6

| LENGTH | PACKET LENGTH |
| --- | --- |
| TYPE | PACKET TYPE: PTP CONNECTION FAILURE RESPONSE |
| REASON | REASON FOR FAILURE (DENIAL, BUSY, ETC) |

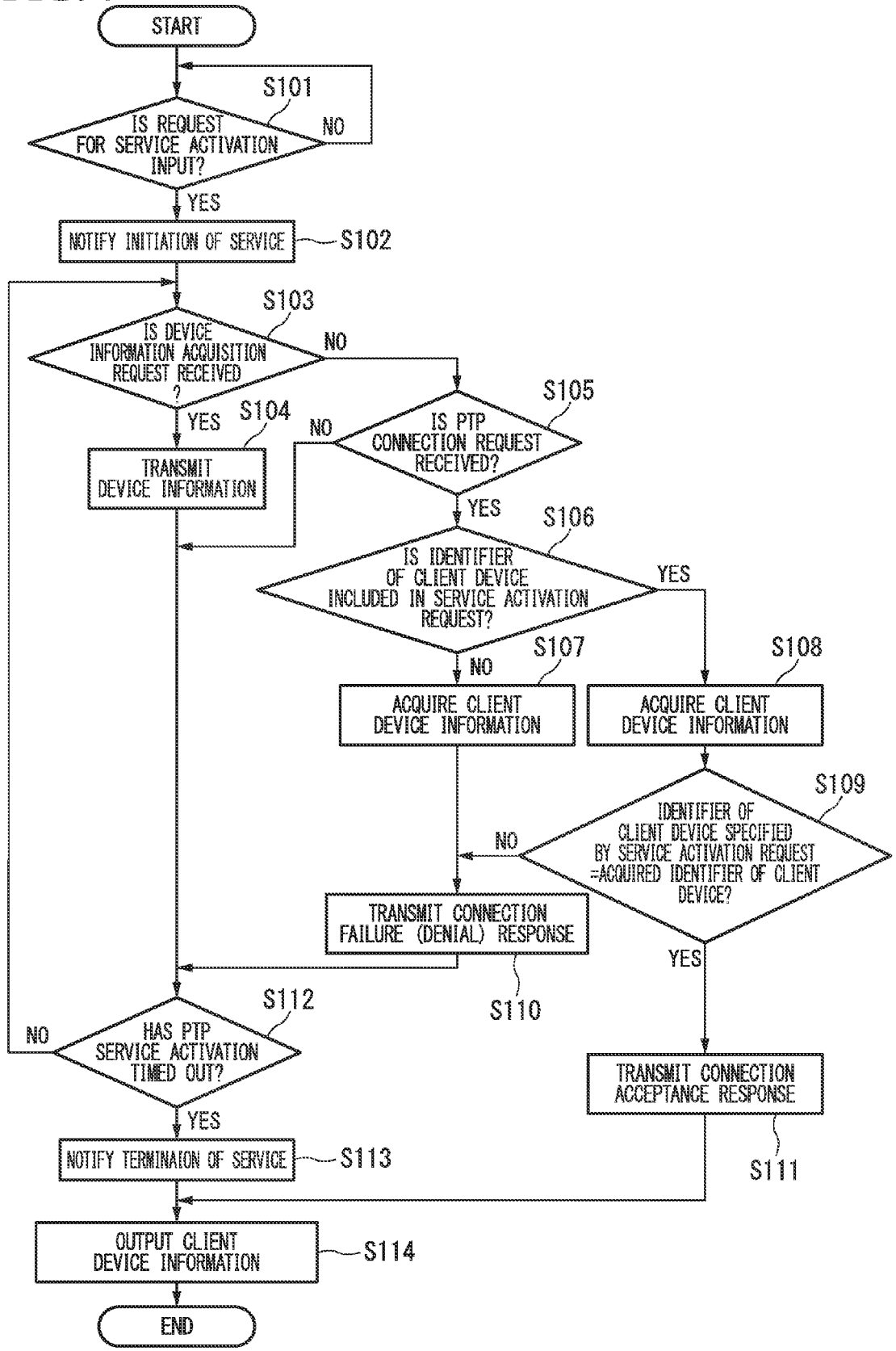

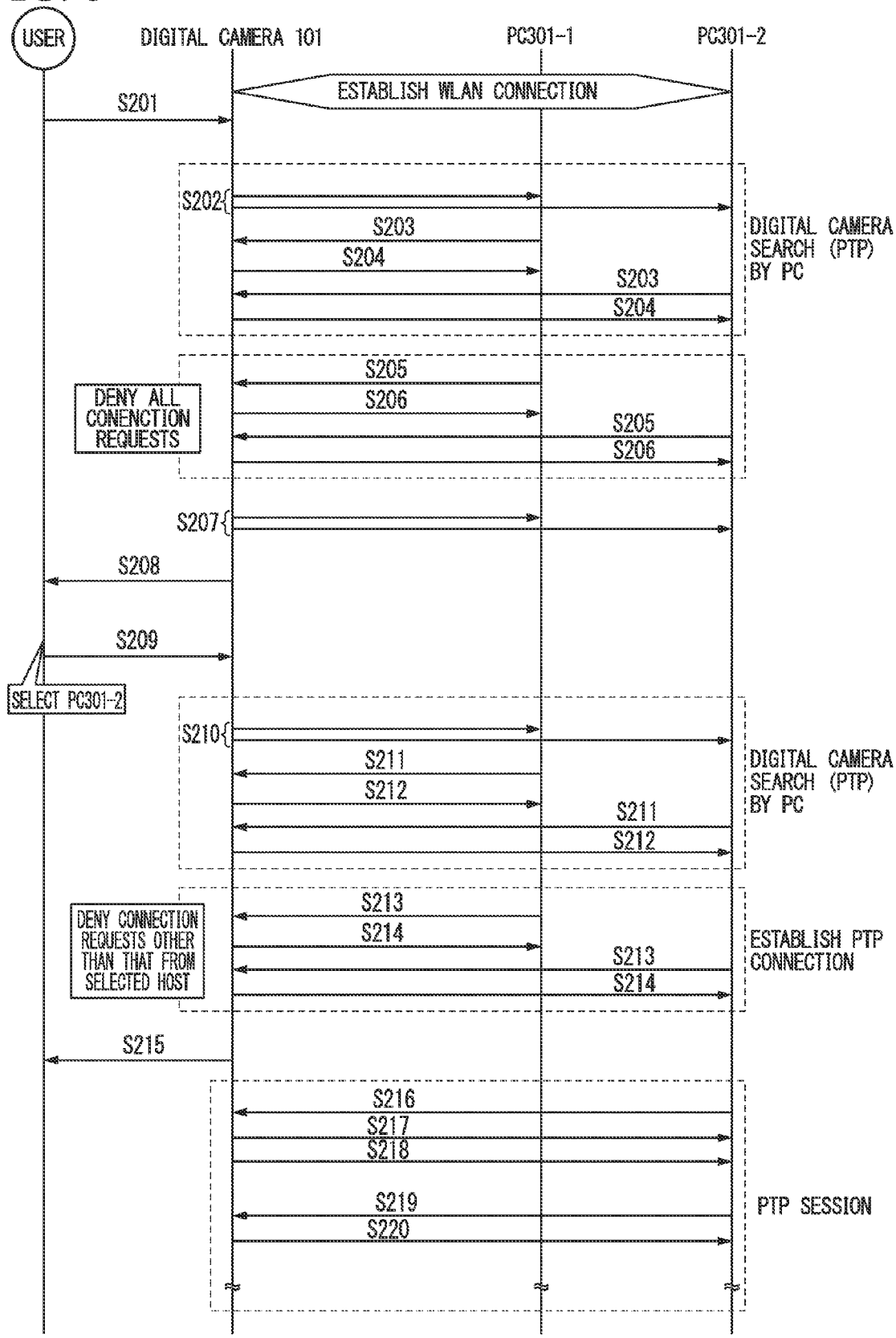

COMMUNICATION DEVICE, COMMUNICATION METHOD, AND NON-TRANSITORY COMPUTER-READABLE RECORDING MEDIUM

BACKGROUND OF THE INVENTION

1. Field of the Invention

The present invention relates to a communication device, a communication method, and a non-transitory computer-readable recording medium.

Priority is claimed on Japanese Patent Application No. 2012-037832, filed Feb. 23, 2012, the content of which is incorporated herein by reference.

2. Description of the Related Art

Generally, when data are transferred between a digital camera and an information processing device, such as a personal computer (PC), connection is established therebetween using a USB (universal serial bus) and a PTP (picture transfer protocol: ISO15740) or MTP (media transfer protocol). The USB is a bus for wired communication. The PTP is one of data transfer protocol.

Recently, WLAN (wireless LAN) digital cameras are on sale, and the wireless networking thereof has progressed. A TCP/IP protocol has been primarily used for communication among devices on a network. Further, to support various applications, FTP (file transfer protocol) for transferring files, HTTP (hypertext transfer protocol) for transferring HTML (hypertext markup language) content, and the like are used on higher layers than the TCP/IP layer. Similarly, the PTP can be network compatible if "PTP (picture transfer protocol) over TCP/IP networks: CIPA DC-005" (hereinafter referred to as "PTP-IP") is used.

Regarding a USB interface, a relationship between a digital camera and an information processing device is the relationship between a USB device and a USB host. When those devices are connected via a cable, a device to be connected is uniquely specified. On the other hand, when multiple devises are present on a network in some cases, it is impossible to uniquely specify a device to be connected at the time those devices participate in network communication. In this case, a device to be connected is specified by a search called discovery, which is defined by UPnP (universal plug and play).

Generally, discovery is means for a client device to detect a server device. In the case of the PTP, an information processing device as a client device detects a digital camera as a server device, and thereby detects a device to be connected. Then, the logical connection is established according to a PTP connection request from the information processing device. However, a digital camera with relatively small resources can be generally connected only to one information processing device, and cannot be connected to multiple information processing devices in some cases. In these cases, the digital camera establishes connection with the information processing device that first transmits a connection request. If there are multiple information processing devices on a network, however, the digital camera is not always connected to a desired information processing device.

FIG. 15 is a sequence chart illustrating a procedure for client devices of a related art to establish PTP connection with a server device. In the case of FIG. 15, the server device is a digital camera 990. The client devices include a PC 991-1 and a PC 991-2. It is assumed here that the digital camera 990 has established WLAN connection with the PC 991-1 and the PC 991-2.

(Step S9901) When a user wants to establish PTP connection between the digital camera 990 and the PC 991-1, the user inputs a service (PTP) activation request instruction to the digital camera 990.

(Step S9902) Upon receiving the service (PTP) activation request instruction, the digital camera 990 transmits service initiation packets to the PC 991-1 and the PC 991-2.

(Step S9903) Upon receiving the service initiation packets, the PC 991-1 and the PC 991-2 transmit device information acquisition request packets to the digital camera 990.

(Step S9904) Upon receiving the device information acquisition request packets, the digital camera 990 transmits device information to the PC 991-1 and the PC 991-2 having transmitted the device information acquisition request packets. Here, the processes from steps S9901 to S9904 are referred to as a "digital camera search process by PC."

(Step S9905) Upon receiving the device information, the PC 991-1 and the PC 991-2 transmit PTP connection request packets to the digital camera 990. In the case of FIG. 15, the PC 991-1 transmits the PTP connection request packet before PC 991-2 does.

(Step S9906) Upon receiving the PTP connection request packet transmitted from the PC 991-1, the digital camera 990 transmits a PTP connection acceptance packet to the PC 991-1 since the digital camera 990 has not yet established PTP connection with any device.

(Step S9907) Upon receiving the PTP connection request packet transmitted from the PC991-2, the digital camera 990 transmits a PTP connection failure (denial) response packet to deny the establishment of PTP connection.

Here, the processes from steps S9905 to S9907 are referred to as a "PTP connection establishment process."

When a user operates a digital camera and simultaneously transfers data, such as when a user takes an image with the digital camera and sequentially transfers the picked-up image to a PC, it is operationally preferable in some cases that the digital camera as the server device searches an information processing device as the client device and thus specifies a device to be connected.

Japanese Patent No. 3840243 discloses the following wireless connection method. The user pairs a digital camera with a PC (information processing device) using a USB cable before wireless connection is established therebetween. Then, the server device acquires information concerning the client device. Then, the server device specifies a connection to be wirelessly connected, using the acquired information concerning the client device, thereby establishing a wireless connection with any device.

SUMMARY

A communication device according to one aspect of the present invention includes, but is not limited to: an input and output unit; a communication unit; and a controller. The input and output unit is configured to receive a first instruction relating to activation of service. The communication unit is configured to communicate with a plurality of other communication devices. The controller is configured to, when the input and output unit receives the first instruction, control the communication unit to transmit to the other communication devices, first data indicating the activation of service. The controller is configured to, in a first case that the first instruction includes no identifiers of the other communication devices, control the communication unit to transmit to the other communication devices which transmits a connection request to the communication device in response to the first data, a negative response indicating non-acknowledgment of the connection request.

A communication method for a communication device according to another aspect of the present invention includes, but is not limited to the following steps. A first instruction relating to activation of service is received. Communication with a plurality of other communication devices is performed. When the first instruction is received, first data indicating the activation of service is transmitted to the other communication devices. In a first case that the first instruction includes no identifiers of the other communication devices, a negative response indicating non-acknowledgment of the connection request is transmitted to every one of the other communication devices which transmits a connection request to the communication device in response to the first data.

A non-transitory computer-readable recording medium according to another aspect of the present invention stores a program causing a computer of a communication device to execute the following steps. A first instruction relating to activation of service is received. Communication with a plurality of other communication devices is performed. When the first instruction is received, first data indicating the activation of service is transmitted to the other communication devices. In a first case that the first instruction includes no identifiers of the other communication devices, a negative response indicating non-acknowledgment of the connection request is transmitted to every one of the other communication devices which transmits a connection request to the communication device in response to the first data.

BRIEF DESCRIPTION OF THE DRAWINGS

The above features and advantages of the present invention will be more apparent from the following description of certain preferred embodiments taken in conjunction with the accompanying drawings, in which:

FIG. 4 schematically illustrates a format of a PTP connection request packet according to the first embodiment;

FIG. 5 schematically illustrates a format of a PTP connection acceptance response packet according to the first embodiment;

FIG. 6 schematically illustrates a format of a PTP connection failure response packet according to the first embodiment;

FIG. 7 is a flowchart illustrating an operational procedure for the digital camera according to the first embodiment;

FIG. 8 is a sequence chart illustrating a communication sequence for the digital camera to establish PTP connection with the PC according to the first embodiment;

DETAILED DESCRIPTION OF THE PREFERRED EMBODIMENTS

The present invention will now be described herein with reference to illustrative embodiments. The accompanying drawings explain a digital camera, a memory card, and a PC (personal computer) in the embodiments. The size, the thickness, and the like of each illustrated portion might be different from those of actual devices.

Those skilled in the art will recognize that many alternative embodiments can be accomplished using the teachings of the present invention and that the present invention is not limited to the embodiments illustrated herein for explanatory purposes.

First Embodiment

Figure 1:
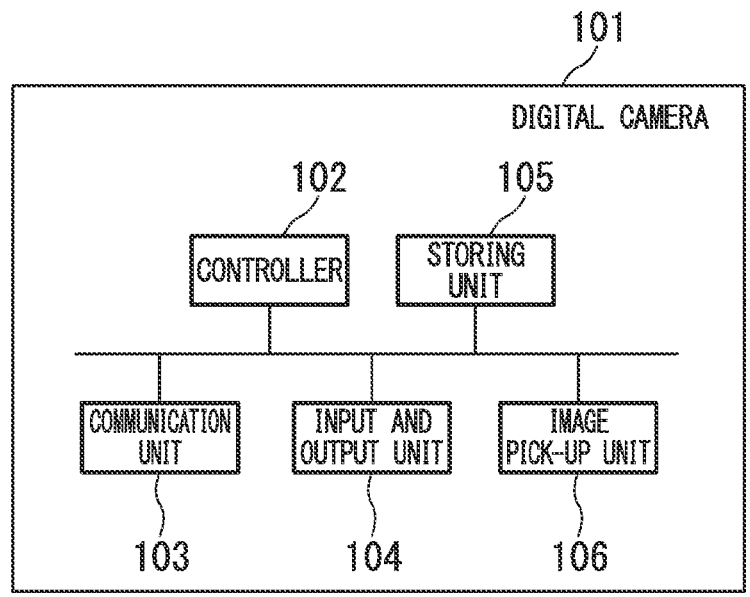
FIG. 1 is a block diagram illustrating a configuration of a digital camera according to a first embodiment of the present invention.

Hereinafter, a first embodiment of the present invention is explained with reference to drawings. FIG. 1 is a block diagram illustrating a configuration of a digital camera 101 according to the first embodiment. As shown in FIG. 1, the digital camera 101 includes: a controller 102; a communication unit 103; an input and output unit 104; a storing unit 105; and an image pick-up unit 106.

The controller 102 controls the overall operation of each unit of the digital camera 101. The communication unit 103 is a communication interface for transmitting and receiving data to and from a PC (personal computer) that is an external device. The communication unit 103 performs wired LAN communication or wireless LAN (WLAN) communication. The input and output unit 104 is an interface that inputs to the controller 102, received data that triggers activation of service, and outputs client device identification information received from the controller 102. Here, a display unit (not shown), such as an LCD, may be configured to display the client device identification information output from the input and output unit 104.

The storing unit 105 stores a control program that controls overall operation of each unit of the digital camera 101, data input and output between the communication unit 103 and the input and output unit 104, image data generated by the image pick-up unit 106, and the like. The storing unit 105 includes a recording medium, such as a RAM, a flash memory, a memory card as an external memory device. The image pick-up unit 106 images a subject to generate an image signal, and performs various image processing on the image signal to generate image data.

Figure 2:
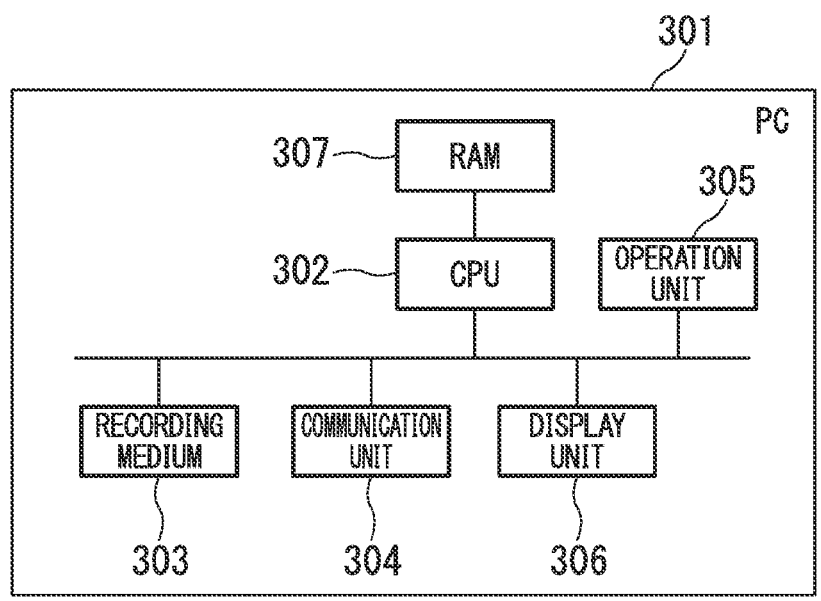
FIG. 2 is a block diagram illustrating a configuration of a PC according to the first embodiment.

FIG. 2 is a block diagram illustrating a configuration of a PC 301 according to the first embodiment. The PC 301 includes: a CPU 302; a recording medium 303; a communication unit 304; an operation unit 305; a display unit 306; and a RAM 307.

The CPU 302 reads and executes a control program stored in the recording medium 303, and reads from and writes to the RAM 307, data necessary to execute a program, thereby controlling overall operation of each unit of the PC 301. The recording medium 303 includes a hard disk or a flash memory. The recording medium 303 stores various data, such as document data or image data. The operation unit 305 includes a keyboard, a mouse, and the like. The operation unit 305 receives an instruction relating to operation of the PC 301.

The display unit 306 includes a liquid crystal display or the like. The display unit 306 displays a user interface screen image, and the document data or the image data read output from the recording medium 303 or the like. The communication unit 304 is a communication interface that transmits various data to and receives various data from a device, such as the digital camera 101 or a printer. The communication unit 304 is a communication interface that transmits data to and receives data from the digital camera 101 as an external device, and performs wired or wireless LAN communication.

Figure 3:
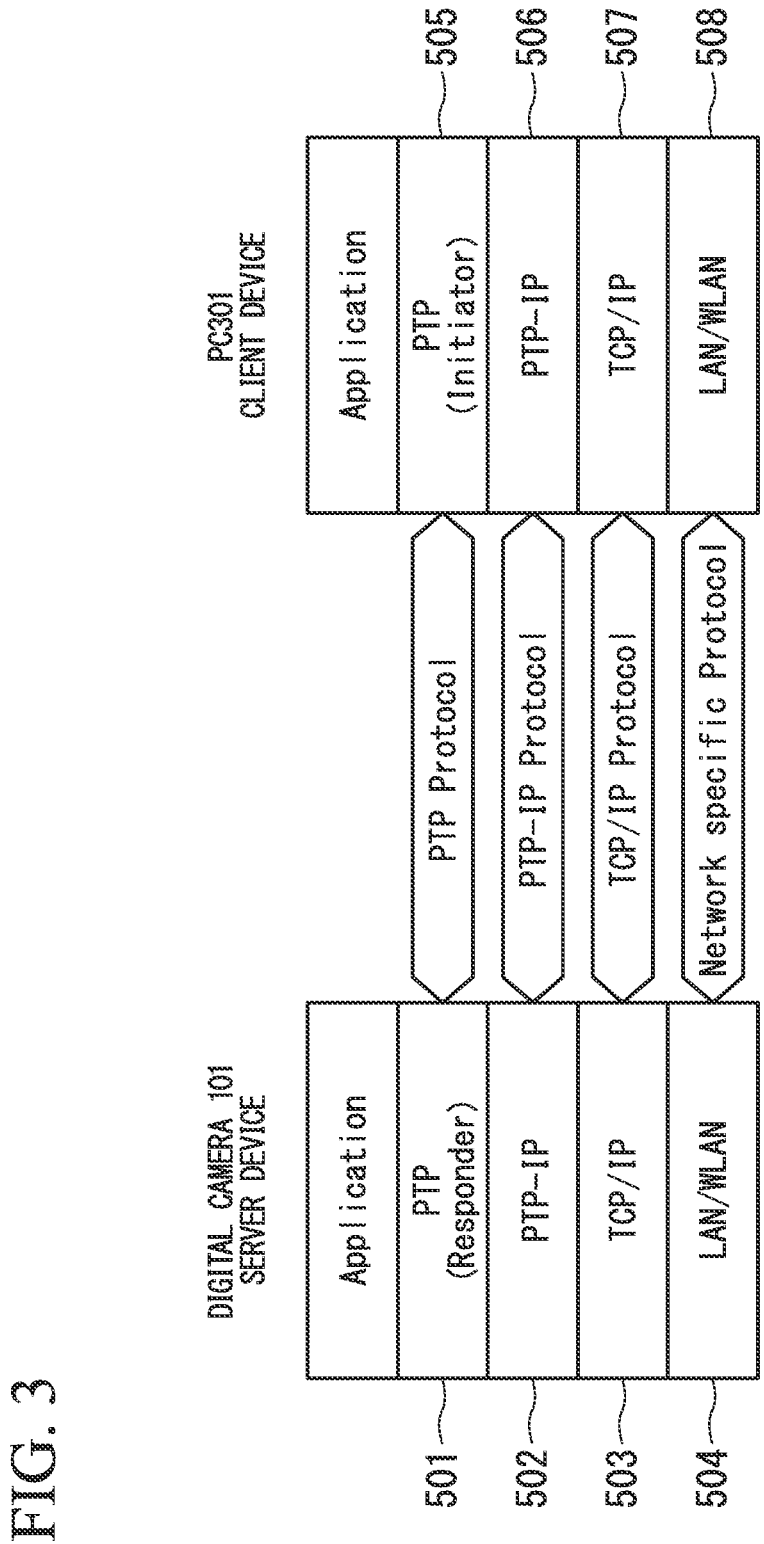
FIG. 3 illustrates a hierarchical structure of protocols used for input and output of data between the digital camera and the PC according to the first embodiment.

FIG. 3 is a hierarchical structure of the protocols used for input and output of data between the digital camera 101 and the PC 301 according to the first embodiment.

In FIG. 3, the protocols used by the communication unit 103 of the digital camera 101 include, sequentially from the highest layer: a PTP (picture transfer protocol: ISO 15740) 501; a PTP-IP (picture transfer protocol over TCP/IP networks: CIPA DC-005); a TCP/IP (transmission control protocol/Internet protocol) 503; and a LAN/WLAN 504. Additionally, the protocols used by the communication unit 304 of the PC 301 include, sequentially from the highest layer: a PTP 505; a PTP-IP 506; a TCP/IP 507; and a LAN/WLAN 508.

Thus, the PTP as an image transfer protocol is used for transmission and reception of data between the digital camera 101 and the PC 301. In a layer underlying the PTP layer, the PTP-IP is used for transmitting PTP data as TCP/IP packets. In a layer underlying the PTP-IP layer, the TCP/IP for transmitting TCP/IP packets is used, and a LAN or a WLAN is used as a physical communication interface. After connection is established between the digital camera 101 and the PC 301, the digital camera 101 operates as a PTP responder, and the PC 301 operates as a PTP initiator. Additionally, an MTP (media transfer protocol) is present as a technology that is the extension of the PTP, but can be treated the same as the PTP. Therefore, the PTP may be replaced with the MTP.

In the first embodiment, the digital camera 101 can also serve as a server device, and the PC 301 can also serve as a client device. Here, service means a function of a PTP responder.

FIG. 4 schematically illustrates the format of a PTP connection request according to the first embodiment. The PTP connection request according to the first embodiment includes data fields for: Length; Type; ID; Name; Version; and Field.

"Length" stores information indicating the "length of the PTP connection request packet." "Type" stores information indicating the "type of packet: PTP connection request." "ID" stores information indicating an "PTP initiator identifier (identifier that uniquely identifies the PC 301 as a client device)." "Name" stores information indicating the "name of the PTP initiator (name of the PC 301 as a client device)." Version stores information indicating "compliant version."

FIG. 5 schematically illustrates the format of the PTP connection acceptance response packet according to the first embodiment. The PTP connection acceptance response packet according to the first embodiment includes data fields for: Length; Type; Connection No; ID; Name; Version; and Field.

"Length" stores information indicating the "length of the PTP connection acceptance response packet." "Type" stores information indicating the "type of packet: PTP connection acceptance response." "Connection No" stores information indicating the "connection number." "ID" stores information indicating "PTP responder identifier (identifier that uniquely identifies the digital camera 101 as a server device)." "Name" stores information indicating the "name of the PTP responder (name of the PC 301 as a client device)." "Version" stores information indicating "supported version."

FIG. 6 schematically illustrates the format of the PTP connection failure response packet according to the first embodiment. The PTP connection failure response packet according to the first embodiment includes data fields for: Length; Type; Reason; and Field.

"Length" stores information indicating the "length of the PTP connection failure response packet." "Type" stores information indicating the "type of packet: PTP connection failure response." "Reason" stores information indicating "the reason for failure (denial, busy, or the like)."

FIG. 7 is a flowchart illustrating the operational procedure of the digital camera 101 according to the first embodiment. A user of the digital camera 101 inputs a service (PTP) activation request instruction to the input and output unit 104 when the user wants to acquire client device list information concerning a client device (PC 301) to be connected (hereinafter referred to as client device list information), or when the user wants to connect the digital camera 101 to a desired client device. The service activation request instruction input to acquire the client device list information does not include a "PTP initiator identifier" that uniquely identifies a client device. The service activation request instruction input to connect the digital camera 101 to the desired client device includes a "PTP initiator identifier" that uniquely identifies the desired client device.

(Step S101) The controller 102 determines whether or not a service activation request instruction is input to the input and output unit 104. When the controller 102 determines that a service activation request instruction is input to the input and output unit 104, the procedure proceeds to step S102. Otherwise, the process in step S101 is performed repeatedly until a service activation request instruction is input.

(Step S102) The controller 102 controls the communication unit 103 to transmit a service initiation packet that notifies initiation of service to all client devices (PCs 301) present within a coverage area of the communication unit 103. Then, the procedure proceeds to step S103.

(Step S103) The client device having received the service initiation packet transmits a device information acquisition request packet to the digital camera 101. The communication unit 103 receives the device information acquisition request packet transmitted from the client device. The controller 102 determines whether or not the device information acquisition request packet is received. If the controller 102 determines that the device information acquisition packet is received, the procedure proceeds to step S104. Otherwise, the procedure proceeds to step S105.

(Step S104) The controller 102 controls the communication unit 103 to transmit device information concerning the digital camera 101 to the client device having transmitted the device information acquisition request packet. Then, the procedure proceeds to step S112.

(Step S105) The client device having received the device information transmits a PTP connection request packet to the digital camera 101. The communication unit 103 receives the PTP connection request packet transmitted from the client device. The controller 102 determines whether or not the communication unit 103 receives the PTP connection request packet. If the controller 102 determines that the communication unit 103 receives the PTP connection request packet, the procedure proceeds to step S106. Otherwise, the procedure proceeds to step S112.

(Step S106) The controller 102 determines whether or not a "PTP initiator identifier" that uniquely identifies a desired client device is included in the service activation request instruction input in step S101. If the controller 102 determines that the PTP initiator identifier is included in the service activation request instruction, the procedure proceeds to step S108. Otherwise, the procedure proceeds to step S107.

(Step S107) The controller 102 acquires the "PTP initiator identifier (information that uniquely identifies a client device)" that is client device information included in the PTP connection request packet received in step S105. At this time, the controller 102 may acquire the "name of the PTP initiator (name of the client device)." Then, the procedure proceeds to step S110.

(Step S108) The controller 102 acquires the "PTP initiator identifier (information that uniquely identifies a client device)" that is client device information included in the PTP connection request packet received in step S105. At this time, the controller 102 may acquire the "name of the PTP initiator (the name of the client device)." Then, the procedure proceeds to step S109.

(Step S109) The controller 102 determines whether or not the "PTP initiator identifier" included in the service activation request instruction input in step S101 is identical to the "PTP initiator identifier" acquired in step S108. If the controller 102 determines that those two identifiers are identical, the procedure proceeds to step S111. Otherwise, the procedure proceeds to step S110.

(Step S110) The controller 102 controls the communication unit 103 to transmit a PTP connection failure (denial) response packet to the client device having transmitted the PTP connection request packet. The PTP connection failure (denial) response packet means a PTP connection failure response packet with information indicating denial set to the Reason Field. The communication unit 103 transmits the PTP connection failure (denial) response packet to the client device having transmitted the PTP connection request packet. Then, the procedure proceeds to step S112.

(Step S111) The controller 102 controls the communication unit 103 to transmit a PTP connection acceptance response packet to the client device having transmitted the PTP connection request packet. The communication unit 103 transmits the PTP connection acceptance response packet to the client device having transmitted the PTP connection request packet. Then, the procedure proceeds to step S114.

(Step S112) The controller 102 determines whether or not the PTP service activation process times out (whether or not a predetermined period has elapsed from the time it is determined in step S101 that the service activation request instruction is input). If the controller 102 determines that the PTP service activation process times out, the procedure proceeds to step S113. Otherwise, the procedure returns to step S103. Here, the time-out period for the PTP service activation process may be predetermined or set arbitrarily.

(Step S113) The controller 102 controls the communication unit 103 to transmit a service termination packet for notifying all the client devices present in the coverage area of the communication unit 103, of a termination of service. Then, the procedure proceeds to step S114.

(Step S114) If the controller 102 acquires the "PTP initiator identifiers" in steps S107 and S110, the controller 102 controls the input and output unit 104 to output all the acquired "PTP initiator identifiers." Then, the procedure ends. If the controller 102 acquires the "name of the PTP initiator (name of the client device)," the controller 102 may output the acquired name of the PTP initiator to the input and output unit 104 while correlating the name of the PTP initiator to the "PTP initiator identifier."

FIG. 8 is a sequence chart illustrating an example of a communication sequence for the digital camera 101 to establish PTP connection with the PC 301. In FIG. 8, the PC 301-1 and the PC 301-2 are present within the coverage area of the communication unit 103 of the digital camera 101. Further, it is assumed here that the digital camera 101 has established WLAN connection with the PC 301-1 and the PC 301-2.

(Step S201) When a user wants to connect the digital camera 101 to any one of PCs 301, the user inputs a service (PTP) activation request instruction to the digital camera 101. The service activation request instruction input at this time does not include a "PTP initiator identifier" that uniquely identifies a client device.

(Step S202) Upon receiving the service (PTP) activation request instruction, the digital camera 101 transmits service initiation packets to the PC 301-1 and the PC 301-2 which are present within the coverage area of the communication unit 103.

(Step S203) Upon receiving the service initiation packets, the PC 301-1 and the PC 301-2 transmit device information acquisition request packets to the digital camera 101.

(Step S204) Upon receiving the device information acquisition request packets, the digital camera 101 transmits device information to the PC 301-1 and the PC 301-2 which have transmitted the device information acquisition request packets.

Here, the processes from steps S202 to S204 are referred to as "a digital camera search process by PC."

(Step S205) Each of the PC 301-1 and the PC 301-2 having received the device information transmits a PTP connection request packet to the digital camera 101. In the case of FIG. 8, the PC 301-1 transmits the PTP connection request packet before the PC 301-2 does.

(Step S206) The service activation request instruction input in step S201 does not include the "PTP initiator identifier" that uniquely identifies a client device. For this reason, the digital camera 101 having received the PTP connection request packet transmitted from the PC 301-1 transmits a PTP connection failure (denial) response packet to the PC 301-1 to deny PTP connection. Similarly, the digital camera 101 having received the PTP connection request packet transmitted from the PC 301-2 transmits a PTP connection failure (denial) response packet to the PC 301-2 to deny PTP connection.

Thus, in the first embodiment, when the service activation request instruction does not include the "PTP initiator identifier" that uniquely identifies a client device, PTP connection failure (denial) response packets are transmitted in response to all the PTP connection request packets. Thereby, it is possible to prevent establishment of PTP connection with a PC 301 other than the desired PC 301.

(Step S207) The digital camera 101 transmits service termination packets to the PC 301-1 and the PC 301-2 which are present within the coverage area of the communication unit 103.

(Step S208) The digital camera 101 acquires and outputs the "PTP initiator identifier" included in the PTP connection request packet. In the case of FIG. 8, the digital camera 101 outputs an identifier that uniquely identifies the PC 301-1 and an identifier that uniquely identifies the PC 301-2. As an outputting method, for example, the identifier that uniquely identifies the PC 301-1 and the identifier that uniquely identifies the PC 301-2 are listed and displayed. Thus, it is possible to more easily acquire information that specifies a device (PC 301) to be wirelessly connected. Additionally, the digital camera 101 may acquire the "names of the PTP initiators," which are client device informations included in the PTP connection request packet in association with the respective identifiers, and list the names of the client devices instead of displaying the identifiers. In this case, it is possible to much more easily specify a device (PC 301) to be wirelessly connected.

(Step S209) The user inputs to the digital camera 101, a service (PTP) activation request instruction including the identifier that uniquely identifies the desired client device to which the user wants to connect the digital camera 101, that identifier being one of the identifier that uniquely identifies the PC 301-1 and the identifier that uniquely identifies the PC 301-2 which are output from the digital camera 101. In the case of FIG. 8, the user inputs to the digital camera 101, the service activation request instruction including the identifier that uniquely identifies the PC 301-2. The service activation request instruction that the user inputs at this time includes the "PTP initiator identifier," that is, the identifier that uniquely identifiers the PC 301-2.

(Step S210) Upon receiving the service (PTP) activation request instruction, the digital camera 101 transmits service initiation packets to the PC 301-1 and the PC 301-2 which are present within the coverage area of the communication unit 103.

(Step S211) The PC 301-1 and the PC 301-2 having received the service initiation packets transmit device information acquisition request packets to the digital camera 101.

(Step S212) Upon receiving the device information acquisition request packets, the digital camera 101 transmits device information to the PC 301-1 and the PC 301-2.

Here, the processes from steps S210 to S212 are referred to as a "digital camera search process by PC."

(Step S213) Each of the PC 301-1 and the PC 301-2 having received the device information transmits a PTP connection request packet to the digital camera 101. In the case of FIG. 8, the PC 301-1 transmits the PTP connection request packet before the PC 301-2 does.

(Step S214) The service activation request instruction input in step S209 includes the "PTP initiator identifier" that uniquely identifies a client device. In the case of FIG. 8, the service activation request instruction includes the "PTP initiator identifier." For this reason, the digital camera 101 having received the PTP connection request packet transmitted from the PC 301-1 other than the PC 301-2 transmits a PTP connection failure (denial) response packet to the PC 301-1 to deny the PTP connection. Additionally, the digital camera 101 having received the PTP connection request packet transmitted from the PC 301-2 transmits a PTP connection acceptance response packet to the PC 301-2 to allow the PTP connection. Thereby, the digital camera 101 can establish PTP connection with the desired PC 301-2. Here, the processes from steps S213 to S214 are referred to as a "PTP connection establishment process."

(Step S215) The digital camera 101 outputs a PTP connection establishment report indicating that the PTP connection has been established. As an outputting method, for example, information indicating that PTP connection has been established is displayed on a liquid crystal display.

(Step S216) The PC 301-2 having established the PTP connection with the digital camera 101 transmits the "Request: device information acquisition request" to the digital camera 101.

(Step S217) The digital camera 101 transmits "Data: device information" to the PC 301-2.

(Step S218) The digital camera 101 transmits "Response: OK" to the PC 301-2.

(Step S219) The PC 301-2 transmits "Request: session initiation request" to the digital camera 101.

(Step S220) The digital camera 101 transmits "Response: OK" to the PC 301-2. Then, the digital camera 101 and the PC 301-2 perform transmission and reception of data using the PTP.

As explained above, according to the first embodiment, if the service activation request instruction does not include the "PTP initiator identifier" that uniquely identifies a client device, the digital camera 101 transmits PTP connection failure (denial) response packets in response to all the PTP connection request packets. Thereby, it is possible to prevent establishment of PTP connection with a client device other than the desired client device.

Additionally, the digital camera 101 acquires and outputs a "PTP initiator identifier" included in the PTP connection request packet. Thus, it is possible to more easily acquire information that identifies a client device to be wirelessly connected.

Further, if the service activation request instruction includes the "PTP initiator identifier" that uniquely identifies a client device, the digital camera 101 transmits a PTP connection acceptance packet (positive response) in response to the PTP connection request packet transmitted from the client device specified by the "PTP initiator identifier."

Moreover, the digital camera 101 transmits a PTP connection failure (denial) response packet in response to the PTP connection request packet transmitted from the client device different from the client device specified by the "PTP initiator identifier." Thereby, it is possible to establish PTP connection with the desired client device.

Second Embodiment

Hereinafter, a second embodiment of the present invention is explained. The second embodiment differs from the first embodiment in that a memory card of the second embodiment is a communication device, and a digital camera of the second embodiment is a server device. In the second embodiment, a system including the memory card and the digital camera is regarded as a communication system. The configuration and operation of the PC 301 of the second embodiment are the same as those of the PC 301 of the first embodiment.

Figure 9:
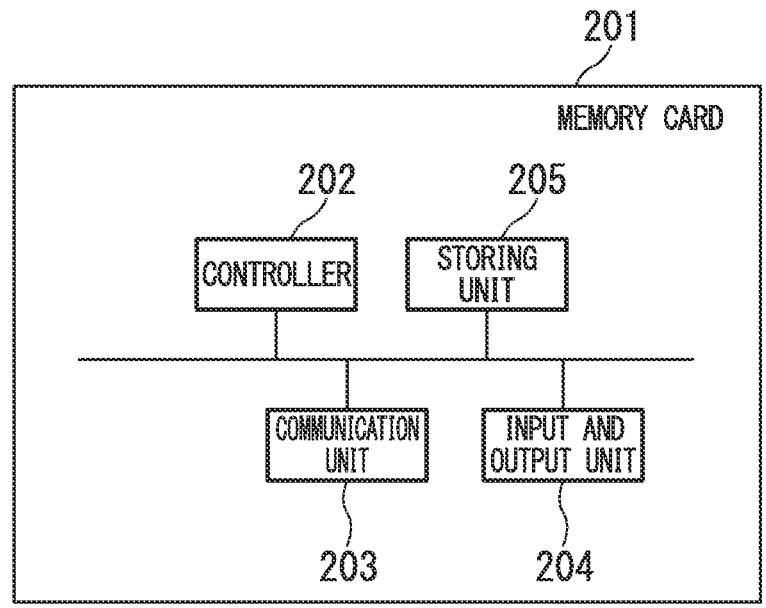
FIG. 9 is a block diagram illustrating a configuration of a memory card according to a second embodiment of the present invention.

FIG. 9 is a block diagram illustrating a configuration of the memory card 201 according to the second embodiment. In FIG. 9, the memory card 201 includes: a controller 202; a communication unit 203; an input and output unit 204; and a storing unit 205. The controller 202 controls overall operation of each unit of the memory card 201. The communication unit 203 is a communication interface for transmitting and receiving data to and from a PC that is an external device. The communication unit 203 performs wireless LAN (WLAN) communication. The input and output unit 204 is an interface that inputs to the controller 202, received data that triggers activation of service, and outputs client device identification information received from the controller 202. Additionally, the input and output unit 204 is a communication interface (such as an SD interface) with a memory card host device, such as a digital camera.

The storing unit 205 stores a control program that controls overall operation of each unit of the memory card 201, data input and output between the communication unit 203 and the input and output unit 204, and data input by a memory card host device via the input and output unit 204 (such as image data when the memory card host device is a digital camera). The storing unit 205 includes a recording medium, such as a RAM or a flash memory.

Figure 10:
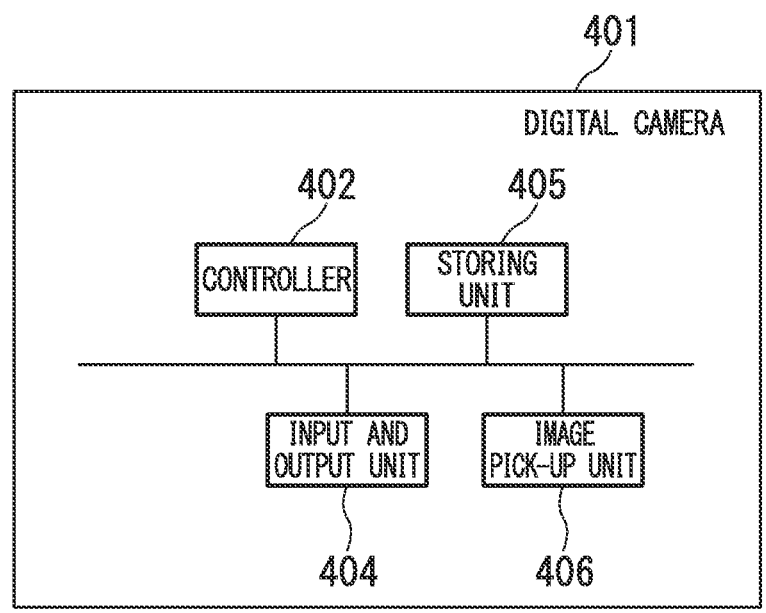
FIG. 10 is a block diagram illustrating a configuration of a digital camera according to the second embodiment.

Hereinafter, a configuration of the digital camera 401 is explained. FIG. 10 is a block diagram illustrating a digital camera 401 according to the second embodiment. In FIG. 10, the digital camera 401 includes: a controller 402; an input and output unit 404; a storing unit 405; and an image pick-up unit 406.

The controller 402 controls overall operation of each unit of the digital camera 401. The input and output unit 404 is an interface that outputs data that triggers activation of service, and inputs client device identification information. Additionally, the input and output unit 404 is a communication interface (such as an SD interface) with the memory card 201. Here, a display unit (not shown), such as an LCD, may be configured to display the client device identification information input to the input and output unit 104.

The storing unit 405 stores a control program that controls overall operation of each unit of the digital camera 401, data input and output by the input and output unit 404, and the like. The storing unit 405 includes a recording medium, such as a RAM, a flash memory, and a memory card as an external memory device. The image pick-up unit 406 images a subject to generate an image signal, and performs various image processing on the image signal to generate image data.

Figure 11:
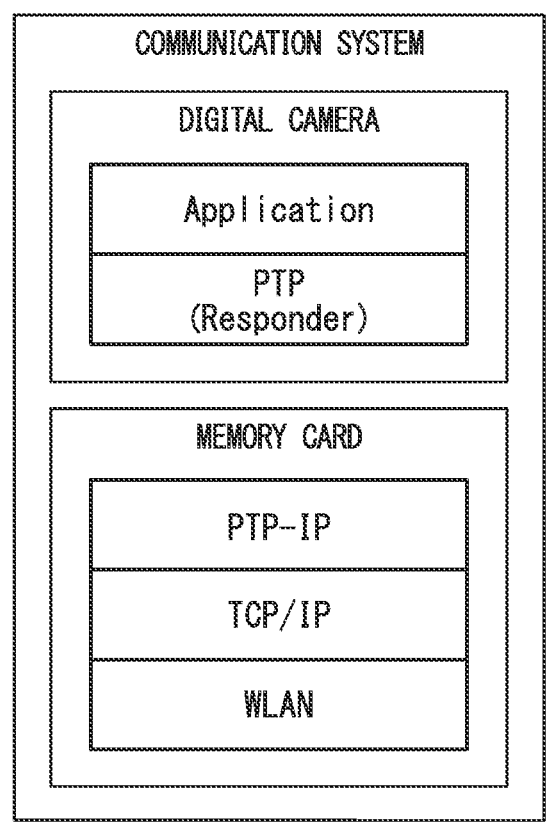
FIG. 11 illustrates a hierarchical structure of protocols used by the memory card and the digital camera according to the second embodiment.

FIG. 11 is a hierarchical structure of the protocol used by the memory card 201 and the digital camera 401 according to the second embodiment. In the second embodiment, the communication system includes the digital camera 401 and the memory card 201. In the protocol hierarchical structure shown in FIG. 3, the memory card 201 has functions of WLAN, TCP/JP, and PTP-IP, and the digital camera 401 has functions of PTP and Application. An interface between the digital camera 401 and the memory card 201 is a memory card interface (such as an SD card interface). A service (PCT) activation request and client device information are input and output via this interface. Further, PTP data (operation request, data, response, and event) transmitted and received between a PTP initiator and a PTP responder are input and output via this interface.

In the second embodiment, the memory card 201 and the digital camera 401 operate as PTP responders, and the PC 301 operates as a PTP initiator. Additionally, the memory card 201 and the digital camera 401 serve as server devices, and the PC 301 serves as a client device. Here, service means a function of a PTP responder.

Figure 12:
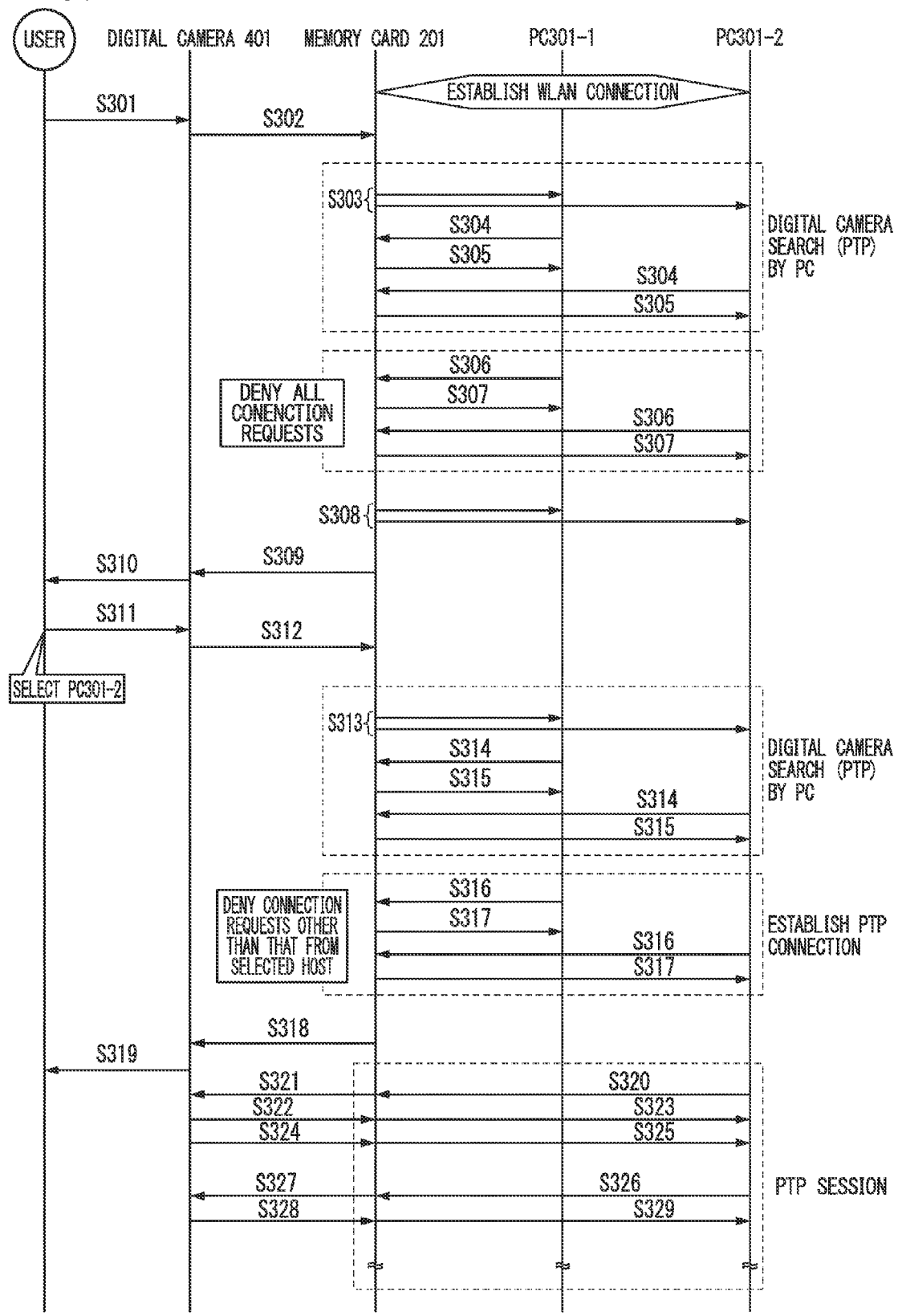
FIG. 12 is a sequence chart illustrating a communication sequence for a communication system including the memory card and the digital camera to establish PTP connection with the PC according to the second embodiment.

FIG. 12 is a sequence chart illustrating an example of a communication sequence for the communication system including the memory card 201 and the digital camera 401 to establish PTP connection with the PC 301. In the case of FIG. 12, the PC 301-1 and the PC 301-2 are present within the coverage area of the communication unit 203 of the memory card 201. It is assumed here that the memory card 201 has established WLAN connection with the PC 301-1 and the PC 301-2.

(Step S301) When a user wants to connect the memory card 201 and the digital camera 401 to any one of PCs 301, the user inputs a service (PTP) activation request instruction to the digital camera 401. The service activation request instruction input by the user at this time does not include a "PTP initiator identifier" that uniquely identifies a client device.

(Step S302) Upon receiving the service (PTP) activation request instruction, the digital camera 401 inputs the received service (PTP) activation request instruction to the memory card 201.

(Step S303) Upon receiving the service (PTP) activation request instruction, the memory card 201 transmits a service initiation packet to the PC 301-1 and the PC 302-2 which are present within the coverage area of the communication unit 203.

(Step S304) Upon receiving the service initiation packet, each of the PC 301-1 and the PC 301-2 transmits a device information acquisition request packet to the memory card 201.

(Step S305) Upon receiving the device information acquisition request packets, the digital camera 201 transmits device information to the PC 301-1 and the PC 301-2 which have transmitted the device information acquisition request packets.

Here, the processes from steps S303 to S305 are referred to as a "digital camera search process by PC."

(Step S306) Each of the PC 301-1 and the PC 301-2 having received the device information transmits a PTP connection request packet to the memory card 201. In the case of FIG. 12, the PC 301-1 transmits the PTP connection request packet before the PC 301-2 does.

(Step S307) The service activation request instruction input in step S301 does not include a "PTP initiator identifier" that uniquely identifies a client device. For this reason, the memory card 201 having received the PTP connection request packet transmitted from the PC 301-1 transmits a PTP connection failure (denial) response packet to the PC 301-1 to deny PTP connection. Similarly, the memory card 201 having received the PTP connection request packet transmitted from the PC 301-2 transmits a PTP connection failure (denial) response packet to the PC 301-2 to deny PTP connection.

Thus, in the second embodiment, if the service activation request instruction does not include a "PTP initiator identifier" that uniquely identifies a client device, PTP connection failure (denial) response packets are transmitted in response to all the PTP connection request packets. Thereby, it is possible to prevent establishment of PTP connection with a PC 301 other than the desired PC 301.

(Step S308) The memory card 201 transmits service termination packets to the PC 301-1 and the PC 301-2 which are present within the coverage area of the communication unit 203.

(Step S309) The memory card 201 acquires and inputs to the digital camera 401, the "PTP initiator identifier" included in the PTP connection request packet. Alternatively, the memory card 201 acquires the "name of the PTP initiator (name of the client device)" that is client device information included in the PTP connection request packet, and inputs the acquired name of the PTP initiator to the digital camera 401 while correlating the name of the PTP initiator to the PTP initiator identifier.

(Step S310) The digital camera 401 outputs the "PTP initiator identifier" that is client device information input by the memory card 201. In the case of FIG. 12, the digital camera 401 outputs an identifier that uniquely identifies the PC 301-1 and an identifier that uniquely identifies the PC 301-2. As an outputting method, for example, the identifier that uniquely identifies the PC 301-1 and the identifier that uniquely identifies the PC 301-2 are listed and displayed. Thus, it is possible to more easily acquire information that specifies a device (PC 301) to be wirelessly connected. Additionally, if "names of the PTP initiator" is input, the digital camera 401 may list and display the names of the client devices instead of displaying the identifiers. In this case, it is possible to much more easily specify a device (PC 301) to be wirelessly connected.

(Step S311) The user inputs to the digital camera 401, a service (PTP) activation request instruction including the identifier that uniquely identifies the desired client device to which the user wants to connect the communication system including the memory card 201 and the digital camera 401, that identifier being one of the identifier that uniquely identifies the PC 301-1 and the identifier that uniquely identifies the PC 301-2 which are output from the digital camera 401. In the case of FIG. 12, the user inputs to the digital camera 401, the service activation request instruction including the identifier that uniquely identifies the PC 301-2. The service activation request instruction that the user inputs at this time includes the "PTP initiator identifier," that is, the identifier that uniquely identifiers the PC 301-2.

(Step S312) Upon receiving the service (PTP) activation request instruction, the digital camera 401 inputs the received service (PTP) activation request instruction to the memory card 201.

(Step S313) Upon receiving the service (PTP) activation request instruction, the memory card 201 transmits service initiation packets to the PC 301-1 and the PC 301-2 which are present within the coverage area of the communication unit 203.

(Step S314) The PC 301-1 and the PC 301-2 having received the service initiation packets transmit device information acquisition request packets to the memory card 201.

(Step S315) Upon receiving the device information acquisition request packets, the memory card 201 transmits device information to the PC 301-1 and the PC 301-2.

Here, the processes from steps S313 to S315 are referred to as a "digital camera search process by PC."

(Step S316) Each of the PC 301-1 and the PC 301-2 having received the device information transmits a PTP connection request packet to the memory card 201. In the case of FIG. 12, the PC 301-1 transmits the PTP connection request packet before the PC 301-2 does.

(Step S317) The service activation request instruction input in step S311 includes the "PTP initiator identifier" that uniquely identifies a client device. In the case of FIG. 12, the service activation request instruction includes the "PTP initiator identifier." For this reason, the memory card 201 having received the PTP connection request packet transmitted from the PC 301-1 other than the PC 301-2 transmits a PTP connection failure (denial) response packet to the PC 301-1 to deny PTP connection. Additionally, the memory card 201 having received the PTP connection request packet transmitted from the PC 301-2 transmits a PTP connection acceptance response packet to the PC 301-2 to allow the PTP connection. Thereby, the memory card 201 can establish PTP connection with the desired PC 301-2. Here, the processes from steps S316 to S317 are referred to as a "PTP connection establishment process."

(Step S318) The memory card 201 inputs to the digital camera 401, a PTP connection establishment report indicating that PTP connection has been established.

(Step S319) The digital camera 101 outputs the PTP connection establishment report indicating that the PTP connection has been established. As an outputting method, for example, information indicating that the PTP connection has been established is displayed on a liquid crystal display or the like.

(Step S320) The PC 301-2 having established the PTP connection with the memory card 201 transmits the "Request: device information acquisition request" to the memory card 201.

(Step S321) The memory card 201 inputs "Request: device information acquisition request" to the digital camera 401.

(Step S322) The digital camera 401 inputs "Data: device information" to the memory card 201.

(Step S323) The memory card 201 transmits "Data: device information" to the PC 301-2.

(Step S324) The digital camera 401 transmits "Response: OK" to the memory card 201.

(Step S325) The memory card 201 transmits "Response: OK" to the PC 301-2.

(Step S326) The PC 301-2 transmits "Request: session initiation request" to the memory card 201.

(Step S327) The memory card 201 inputs "Request: session initiation request" to the digital camera 401.

(Step S328) The digital camera 401 inputs "Response: OK" to the memory card 201.

(Step S329) The memory card 201 transmits "Response: OK" to the PC 301-2. Then, the communication system including the memory card 201 and the digital camera 401 transmits and receives data to and from the PC 301-2 using the PTP.

As explained above, according to the second embodiment, if the service activation request instruction does not include the "PTP initiator identifier" that uniquely identifies a client device, the communication system including the memory card 201 and the digital camera 401 transmits PTP connection failure (denial) response packets in response to all the PTP connection request packets. Thereby, it is possible to prevent establishment of PTP connection with a client device other than the desired client device. Additionally, the communication system including the memory card 201 and the digital camera 401 acquires and outputs the "PTP initiator identifier" that uniquely identifies a client device. Thereby, it is possible to more easily acquire information that specifies a client device to be wirelessly connected.

Further, if the service activation request instruction includes the "PTP initiator identifier" that uniquely identifies a client device, the communication system including the memory card 201 and the digital camera 401 transmits a PTP connection acceptance packet (positive response) in response to the PTP connection request packet transmitted from the client device specified the "PTP initiator identifier."

Moreover, the communication system transmits a PTP connection failure (denial) response packet in response to the PTP connection request packet transmitted from the client device different from the client device specified by the "PTP initiator identifier." Thereby, it is possible to establish PTP connection with the desired client device.

Figure 13:
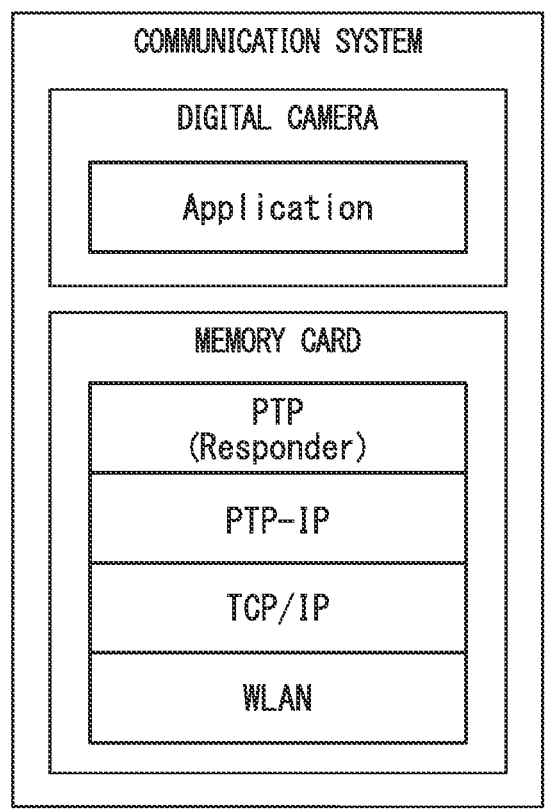
FIG. 13 illustrates a hierarchical structure of protocols used by the memory card and the digital camera according to the second embodiment.

In the aforementioned case, the communication system includes the memory card 201 and the digital camera 401. In the protocol hierarchical structure shown in FIG. 3, the memory card 201 has functions of WLAN, TCP/JP, and PTP-IP, and the digital camera 401 has functions of PTP and Application. However, a configuration is not limited thereto. For example, as shown in FIG. 13, the memory card 201 may have the functions of WLAN, TCP/JP, PTP-IP, and PTP, and the digital camera 401 may have the function of Application.

In this case, as explained above, an interface between the digital camera 401 and the memory card 201 is a memory card interface (such as an SD card interface). A service (PTP) activation request and client device information are input and output via this interface. Further, PTP data (operation request, data, response, and event) transmitted and received between a PTP initiator and a PTP responder are processed in the memory card 201.

In this case, as explained above, the memory card 201 and the digital camera 401 operate as PTP responders, and the PC 301 operates as a PTP initiator. Additionally, the memory card 201 and the digital camera 401 serve as server devices, and the PC 301 serves as a client device. Here, service means a function of a PTP responder.

Figure 14:
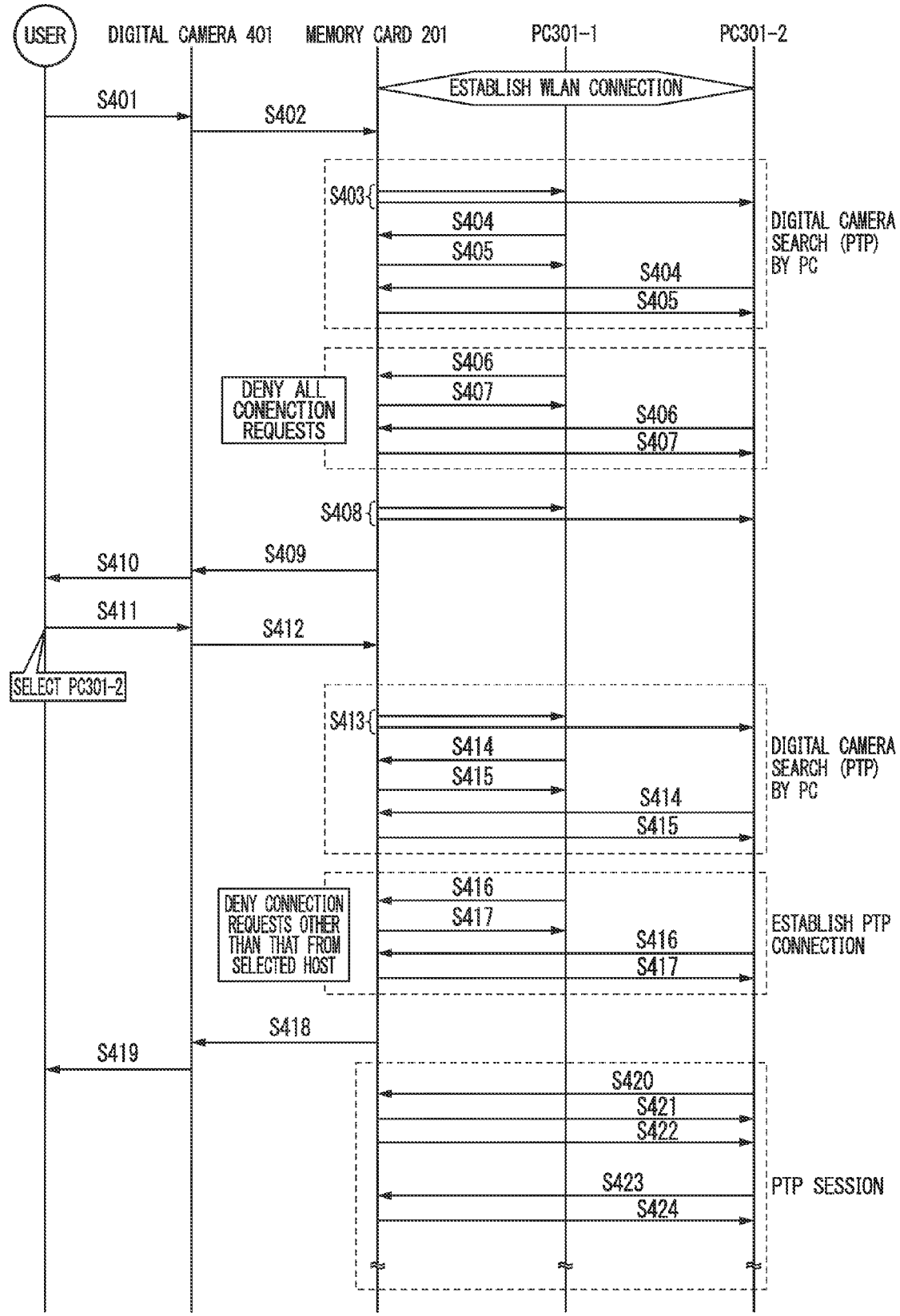
FIG. 14 is a sequence chart illustrating a communication sequence for the communication system including the memory card and the digital camera to establish PTP connection with the PC according to the second embodiment.
Figure 15:
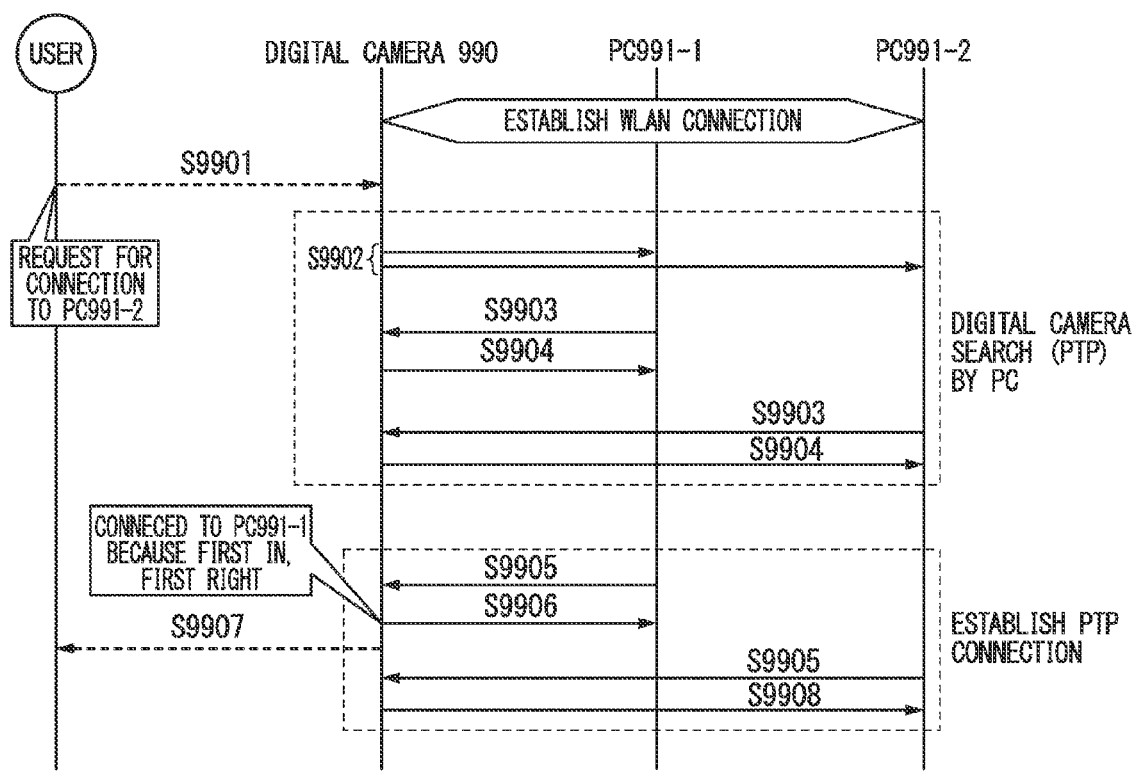
FIG. 15 is a sequence chart illustrating a procedure for a client device to establish PTP connection with a server device according to a related art.

FIG. 14 is a sequence chart illustrating an example a communication sequence for the communication system including the memory card 201 and the digital camera 401 to establish PTP connection with the PC 301, in a case where the memory card 201 has the functions of WLAN, TCP/JP, PTP-IP, and PTP, and the digital camera 401 has the function of Application.

In the case of FIG. 14, the PC 301-1 and the PC 301-2 are present within the coverage area of the communication unit 203 of the memory card 201. It is assumed here that the memory card 201 has established WLAN connection with the PC 301-1 and the PC 301-2.

The processes from steps S401 to S419 are similar to the processes from steps S301 to S319 shown in FIG. 12.

(Step S420) The PC 301-2 having established the PTP connection with the memory card 201 transmits the "Request: device information acquisition request" to the memory card 201.

(Step S421) The memory card 201 transmits "Data: device information" to the PC 301-2.

(Step S422) The digital camera 201 transmits "Response: OK" to the PC 301-2.

(Step S423) The PC 301-2 transmits "Request: session initiation request" to the memory card 201.

(Step S424) The memory card 201 transmits "Response: OK" to the PC 301-2. Then, the memory card 201 transmits and receives data to and from the PC 301-2 using the PTP.

As explained above, even in a case where the memory card 201 has the functions of WLAN, TCP/JP, PTP-IP, and PTP, and the digital camera 401 has the function of Application, if the service activation request instruction does not include a "PTP initiator identifier" that uniquely identifies a client device, the communication system including the memory card 201 and the digital camera 401 transmits PTP connection failure (denial) response packets in response to all the PTP connection request packets. Thereby, it is possible to prevent establishment of PTP connection with a client device other than the desired client device. Additionally, the communication system including the memory card 201 and the digital camera 401 acquires and outputs the "PTP initiator identifier" that uniquely identifies a client device. Thereby, it is possible to more easily acquire information that specifies a client device to be wirelessly connected.

Further, if the service activation request instruction includes a "PTP initiator identifier" that uniquely identifies a client device, the communication system including the memory card 201 and the digital camera 401 transmits a PTP connection acceptance packet (positive response) in response to the PTP connection request packet transmitted from the client device specified by the "PTP initiator identifier."

Moreover, the communication system transmits a PTP connection failure (denial) response packet in response to the PTP connection request packet transmitted from the client device different from the client device specified by the "PTP initiator identifier." Thereby, it is possible to establish PTP connection with the desired client device.

A computer readable recording medium may record a program for implementing all or part of the functions of each unit included in the digital cameras 101 and 401, and the memory card 201, so that those functions can be implemented by a computer system reading and executing the program recorded in the recording medium. Here, the "computer system" includes an OS and hardware, such as a peripheral device.

Additionally, the "computer readable recording medium" includes a portable medium such as a flexible disc, a magneto-optical disc, a ROM, or a CD-ROM, and a storage device such as a hard disk built in the computer system. The "computer readable recording medium" may include a medium that dynamically stores a program for a short period of time, such as a communication line used in a case where a program is transmitted via a network such as the Internet or a communication line such as a telephone line. Additionally, the "computer readable recording medium" may include a medium that stores a program for a predetermined period of time, such as a volatile memory built in a computer system serving as a server or client in the above case. Additionally, the program may be a program for implementing part of the aforementioned functions. Further, the program may be a program that can implement the aforementioned functions in combination with a program already recorded on the computer system.

Although the embodiments of the present invention have been explained with reference to the drawings, the present invention is not limited to the above embodiments, and may be modified and changed without departing from the scope of the invention. For example, although PTP is used as a protocol in the above embodiments, the configuration is not limited thereto, and MTP (media transfer protocol) that is the expansion of the PTP may be used.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:
1. A communication device comprising:
   an input and output unit configured to receive a first instruction relating to activation of service;
   a communication unit configured to communicate with a plurality of client devices; and
   a controller configured to, when the input and output unit receives the first instruction, control the communication unit to transmit to the plurality of client devices, first data indicating the activation of service, the controller being configured to, in a first case that the first instruction includes no identifiers of the plurality of client devices, control the communication unit to transmit to every one of the plurality of client devices which transmits a connection request to the communication device in response to the first data, a negative response indicating non-acknowledgment of the connection request, wherein when a communication connection established state is defined as a state that the connection request is sent and a positive response corresponding to the connection request is received; a server device is defined as a device which provides service to the client devices; the client device is defined as a device which utilize the service provided by the server device; and a communication protocol is defined as a protocol which is defined that only the client device is capable of sending the connection request, the communication protocol being in a layer higher than that of TCP protocol and lower than application layer according to OSI reference model, the communication device operates according to the communication protocol.

2. The communication device according to claim 1, further comprising:

a display unit;

wherein the connection request includes a first identifier of a first other communication device of the other communication devices which transmits the connection request, and the controller is configured to control the input and output unit to output the first identifier to the display unit.

3. The communication device according to claim 2, wherein the input and output unit is configured to receive the first instruction from a server device, and the input and output unit is configured to output the first identifier to the server device.

4. The communication device according to claim 1, wherein the controller is configured to, in the first case, after the communication unit transmits the negative response, control the communication unit to transmit to the every one of the other communication devices which transmits the connection request, a second data indicating termination of service by the communication device.

5. The communication device according to claim 1, wherein the controller is configured to, in a second case that the first instruction includes a first identifier of a first other communication device of the other communication devices, control the communication unit to transmit to the first other communication device in response to a connection request therefrom, a positive response indicating acknowledgment of the connection request, and transmit to all the other communication devices excluding the first other communication device in response to connection requests therefrom, negative responses indicating non-acknowledgment of the connection requests.

6. The communication device according to claim 5, wherein in the first case, the first instruction is an instruction to search at least one connectable communication device from among the other communication devices, and in the second case, the first instruction is an instruction to establish connection to the first other communication device.

7. The communication device according to claim 5, further comprising:

a storing unit configured to store content data, wherein the controller is configured to, in the second case, after the communication unit transmits the positive response to the first other communication device, control the communication unit to transmit the content data to the first other communication device.

8. The communication device according to claim 7, further comprising:

an image pickup unit configured to generate image data, wherein the storing unit is configured to store the image data generated.

9. The communication device according to claim 1, wherein the communication unit uses a communication protocol to communicate with the other communication devices, and the communication protocol comprises a picture transfer protocol or a media transfer protocol which are higher than a transmission control protocol.

10. A communication method for a communication device, comprising:

receiving a first instruction relating to activation of service;

communicating with a plurality of client devices;

when receiving the first instruction, transmitting to the plurality of client devices, first data indicating the activation of service; and in a first case that the first instruction includes no identifiers of the plurality of client devices, transmitting to every one of the plurality of client devices which transmits a connection request to the communication device in response to the first data, a negative response indicating non-acknowledgment of the connection request, wherein when a communication connection established state is defined as a state that the connection request is sent and a positive response corresponding to the connection request is received; a server device is defined as a device which provides service to the client devices; the client device is defined as a device which utilize the service provided by the server device; and a communication protocol is defined as a protocol which is defined that only the client device is capable of sending the connection request, the communication protocol being in a layer higher than that of TCP protocol and lower than application layer according to OSI reference model, the communication device operates according to the communication protocol.

11. The communication method according to claim 10, further comprising:

receiving a first connection request from a first other communication device of the other communication devices, the first connection request including a first identifier of the first other communication device; and displaying the first identifier.

12. The communication method according to claim 11, further comprising:

outputting the first identifier to a server device that transmits the first instruction to the communication device.

13. The communication method according to claim 10, further comprising:

in the first case, after transmitting the negative response, transmitting to the every one of the other communication devices which transmits the connection request, a second data indicating termination of service by the communication device.

14. The communication method according to claim 10, further comprising:

in a second case that the first instruction includes a first identifier of a first other communication device of the other communication devices, transmitting to the first other communication device in response to a connection request therefrom, a positive response indicating acknowledgment of the connection request; and transmitting to all the other communication devices excluding the first other communication device in response to connection requests therefrom, negative responses indicating non-acknowledgment of the connection requests.

15. The communication method according to claim 14, further comprising:
- storing content data; and
- in the second case, after transmitting the positive response to the first other communication device, transmitting the content data to the first other communication device.

16. The communication device according to claim 15, further comprising:
- generating image data; and
- storing the image data generated.

17. The communication method according to claim 10, wherein communicating with the other communication devices is performed using a communication protocol,
- wherein the communication protocol comprises a picture transfer protocol or a media transfer protocol which is higher than a transmission control protocol.

18. A non-transitory computer-readable recording medium storing a program causing a computer of a communication device to execute:
- receiving a first instruction relating to activation of service;
- communicating with a plurality of client devices;
- when receiving the first instruction, transmitting to the plurality of client devices, first data indicating the activation of service; and
- in a first case that the first instruction includes no identifiers of the plurality of client devices, transmitting to every one of the plurality of client devices which transmits a connection request to the communication device in response to the first data, a negative response indicating non-acknowledgment of the connection request, wherein
- when a communication connection established state is defined as a state that the connection request is sent and a positive response corresponding to the connection request is received; a server device is defined as a device which provides service to the client devices; the client device is defined as a device which utilize the service provided by the server device; and a communication protocol is defined as a protocol which is defined that only the client device is capable of sending the connection request, the communication protocol being in a layer higher than that of TCP protocol and lower than application layer according to OSI reference model,
the communication device operates according to the communication protocol.

19. The non-transitory computer-readable recording medium according to claim 18, further comprising:
- in the first case, after transmitting the negative response, transmitting to the every one of the other communication devices which transmits the connection request, a second data indicating termination of a connection process with the communication device.

20. The non-transitory computer-readable recording medium according to claim 18, further comprising:
- in a second case that the first instruction includes a first identifier of a first other communication device of the other communication devices, transmitting to the first other communication device in response to a connection request therefrom, a positive response indicating acknowledgment of the connection request; and
- transmitting to all the other communication devices excluding the first other communication device in response to connection requests therefrom, negative responses indicating non-acknowledgment of the connection requests.

* * * * *